United States Patent [19]

Norton et al.

[11] 4,005,947
[45] Feb. 1, 1977

[54] FLUID OPERATED ROTOR

[76] Inventors: Joseph R. Norton, 724 Skyline Place, Stillwater, Okla. 74074; Sidney E. Scisson, 2835 E. 58th, Tulsa, Okla. 74105

[22] Filed: Feb. 10, 1975

[21] Appl. No.: 548,243

[52] U.S. Cl. .................... 416/197 A; 416/243
[51] Int. Cl.[2] ........................................ F03D 3/06
[58] Field of Search .......... 416/197, 178, 179, 187, 416/197 A, 243, 242

[56] References Cited

UNITED STATES PATENTS

| 2,067,542 | 1/1937 | Penton | 416/179 X |
| 3,645,694 | 2/1972 | Flatau | 416/197 X |

FOREIGN PATENTS OR APPLICATIONS

| 727,519 | 6/1932 | France | 416/197 |
| 961,999 | 5/1950 | France | 416/197 |
| 634,364 | 8/1936 | Germany | 416/197 |
| 634,948 | 9/1936 | Germany | 416/197 |
| 65,940 | 12/1924 | Sweden | 416/197 |
| 270,858 | 5/1927 | United Kingdom | 416/119 |

*Primary Examiner*—Everette A. Powell, Jr.
*Attorney, Agent, or Firm*—Head, Johnson & Chafin

[57] ABSTRACT

A moving-fluid-operated rotor for the utilization of a portion of the energy of a moving fluid, comprises a rotor rotatable about a vertical axis. The rotor has four blades, or wings, which may, for convenience, be described as semicylindrical elements. The first and second elements are of equal diameter and are arranged in the form of an S-shape with the diametral planes passing through the two edges of the semi-cylinder being coincident for the two wings. The other two wings are semi-cylinders of larger radius than the first two. They have their diametral planes coincident with those of the first two elements, and they are each substantially coaxial with one of the first two elements. Wind flow into the open ends of the first and third wings passes along the curvature of these elements and is redirected into the corresponding curvatures of the second and fourth wings, so that the wind exerts a forward pressure on one set, and a reverse pressure on the opposite set, providing additive torque to the rotor.

6 Claims, 7 Drawing Figures

FLUID OPERATED ROTOR

BACKGROUND OF THE INVENTION

This invention lies in the field of windmills and wind operated devices generally. More specifically, it concerns rotating cylindrical structures as contrasted with rotating planar structures, such as the conventional windmills.

In the prior art there has been some work done on the use of curved blades, or curved winged rotors, which are adapted to rotate about a vertical axis at the point where the curved wings are joined together. The S-shaped vane or wings are the most common form of prior art. However, these have a serious disadvantage in that wind blowing into one concave portion creates a positive pressure, while a negative pressure is simultaneously generated in the opposite one, restraining the rotation of the rotor.

In the prior art it has been discovered that by separating the two halves of the S-shaped wing, that is, having the two semi-cylinders overlap one another, then a continuous flow of wind into one semi-cylinder and then into the second, eliminates the negative pressure and creates a positive pressure in the concave portions of both wings, and therefore provides additional torque.

In this invention, use is made of a combination of the S-type wings and the overlapped wings to provide additional torque.

SUMMARY OF THE INVENTION

It is the primary object of this invention to provide a rotating wing structure which can be turned by the flow of fluid such as wind or water so as to derive mechanical energy from the kinetic energy of the fluid. It is a further object to provide a more efficient type of fluid driven rotor than the conventional rotor.

These and other objects are realized and the limitations of the prior art are overcome in this invention by a combination of the "S" shaped rotor and of the displaced semi-cylindrical rotor, so that additional force on the rotating assembly is derived from the flow of the fluid. The segments of the rotor may be semi-cylindrical sheets of metal or they may be shaped in eliptical or other shapes. They may be built up of double walled wings simulating a curved aero-dynamic wing section. While we speak of the energy of a moving fluid, which may be a gas or a liquid, the apparatus will be described in terms of a moving gas such as the wind.

BRIEF DESCRIPTION OF THE DRAWINGS

These and other objects and advantages of this invention and a better understanding of the principles and details of the invention will be evident from the following description taken in conjunction with the appended drawings in which.

DESCRIPTION OF THE PREFERRED EMBODIMENT

Figures 1, 2, 3A, 3B, 4:
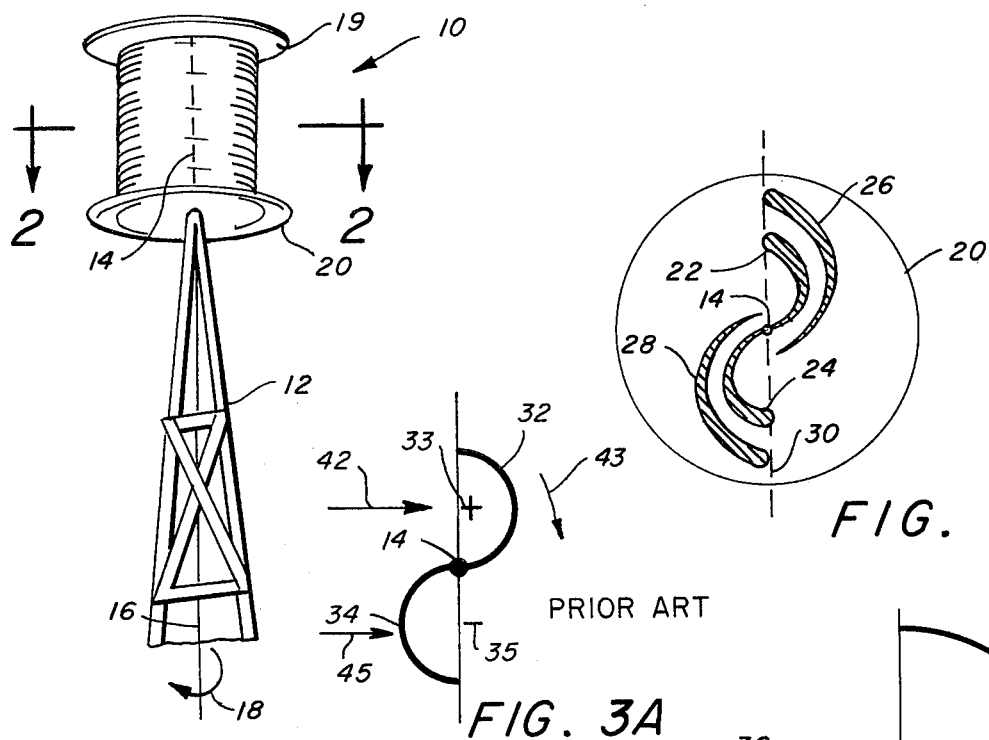
FIG. 1 gives a stylized picture of the invention.
FIG. 2 shows a cross section along the plane 2—2 of FIG. 1.
FIGS. 3A and 3B show examples of the prior art.
FIG. 4 shows one embodiment of this invention.

Referring now to the drawings, and in particular to the FIG. 1, there is shown a rotating assembly 10 mounted on top of a vertical structure or tower 12. The structure 10 comprises an assembly with upper and lower end plates which are circular. The structure is designed around a vertical axis 14. The structure is assembled on vertical bearings and carries a shaft 16 vertically down through the tower to operate mechanical apparatus (not shown). The shaft 16 turns in accordance with arrow 18 is synchronism with the rotation of the assembly 10.

FIG. 2 shows a cross section of the assembly 10. This comprises a set of four curved wings, sheets, or plates. For the sake of convenience these will be called semicylindrical plates although, as will be described later, they can be in other than circular cross sections.

There are two inner wings 22 and 24 which comprise semicylindrical plates attached edge to edge in the form of an S curve. The joint between the two portions 22 and 24 comprise an axis 14 which is mounted vertically in appropriate bearings, etc. not shown. The diametral planes passing through each of the two semicylinders 22 and 24 are coincident, and are indicated by the numeral 30.

There are two larger wings 26 and 28 which are also semicylinders, and are coaxial respectively with the first two semicylinders 22 and 24. They, likewise, have their diametral planes in the plane 30.

Referring to FIGS. 3A and 3B, there are shown two rotors which are known in the prior art. FIG. 3A shows a rotor made in the form of semi-cylindrical sheets attached in the form of an S-curve. They are mounted for rotation about a vertical axis 14, assuming that wind flows against the rotor in accordance with arrows 42, 45. This will create a positive pressure on both the convex and concave portions, with a resultant positive pressure 33 in the concave wing 32 and will tend to rotate the wing in a clockwise direction in accordance to arrow 43. As the wing rotates, a suction, or negative pressure, 35 will be generated in the concave portion of the wing 34. This suction acts as a drag on the rotation, and therefore, the output torque on the shaft 14 due to the wind 42, 45 will be reduced because of the suction generated at the point 35.

In the prior art the old S wing, as shown in FIG. 3A was modified by Savonius with the two semi-cylinders displaced so as to overlap each other, as shown in FIG. 3B. This is known as the Savonius wing. In other words, their axes have been brought closer together than the diameter, as was the case in FIG. 3A, and there is a gap between the two edges of the wings 32A and 34A. Now, with air flowing in the direction of the dashed arrows 36 there is a reversal in direction of the air passing along the curve of the wing 32A, which reverses its direction 38, and acts along the curve of the second wing 34A, causing a further reversal to the direction 40, thus the passage of the wind has not only removed the negative pressure in the concave portion of the wing 34A but there has been a flow of air against the inside concave portions of both wings, providing two pressures, one on each of the wings, and therefore a greater torque output. Thus the Savonius wing of FIG. 3B is a more efficient rotor structure than that of the original S wing of FIG. 3A.

Referring now to FIG. 4, there is shown a combination of the S-wing combining two semi-cylinders 44 and 46, joined at their edge, and forming an axis of rotation 14, with the Savonius wing. This comprises two other semi-cylinders 48 and 50, of larger diameter, one surrounding each of the two semi-cylinders 44 and 46. It is thus seen that there are now two sets of curved surfaces, so that wind flowing in the direction of the arrows 52 and 54 will respectively pass along the curved surfaces 48 and 44 and will be reversed in directions in accordance with arrows 55 and 57 and will pass along the curved surfaces 50 and 46, and will exit as the arrows 56 and 58. In other words, the action is similar to that of FIG. 3B but there are now two sets of double curved surfaces, with the opportunity to obtain additional pressure effect from the kinetic energy of the wind.

In FIG. 4 the two sets of wings are shown as semi-cylinders, and are all co-planer, i.e., their diametral planes are co-planar. There is also opportunity to vary the spacing of the outer set of wings 48 and 50 so that they are not necessarily co-axial to their corresponding inner wings 44 and 46. The exact spacing of the wings depends upon their particular curvature.

Figure 5:
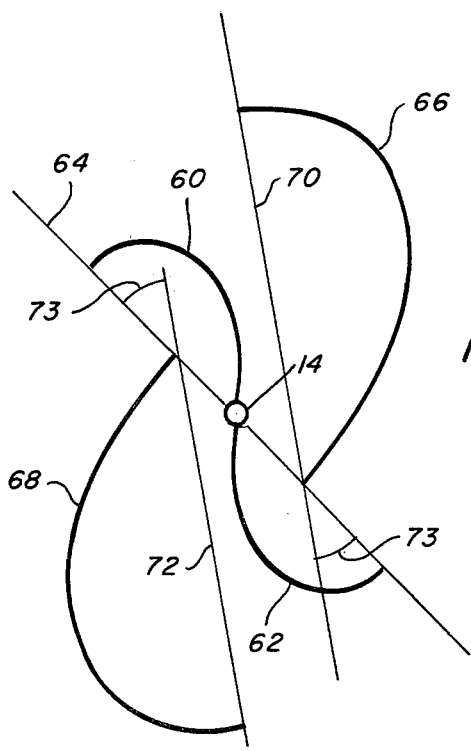
FIG. 5 shows a variation of the embodiment of FIG. 4.

Referring now to FIG. 5, there is shown a modification of the assembly of FIG. 4 which again uses two sets of wings an S-wing and outer Savonius wings, similar to that of FIG. 4. However, in this figure, the wings are shown not as semicylinders, but as elliptical or other aerodynamic sections, which are well known in the art of airplane wings and other devices of that sort.

Furthermore, in FIG. 5 the planes defining the edges of the wings 66 and 68, namely planes 70 and 72, are set at angle 73 with respect to the plane 64 of the two wings 60 and 62. By inserting the angle 73, which may vary over a range of 20° to 40° or 60°, it is possible to get a more continuous torque from the wind flowing over the wings, without departing from the benefits of the double flow of wind against each of a pair of wings, with consequent greater utilization of the kinetic energy of the wind.

Figure 6:
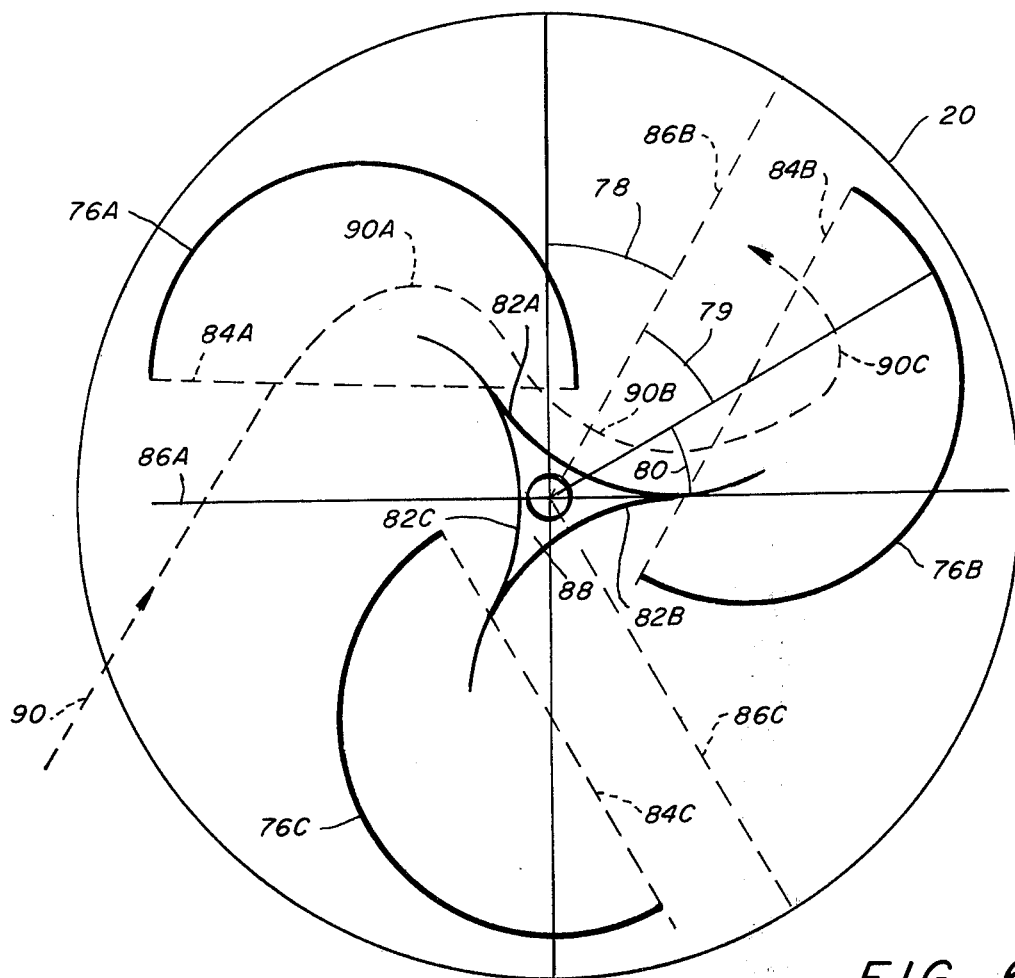
FIG. 6 shows a third embodiment having three sets of wings spaced at 120° from each other.

The novelty of the combination of the S-wing and the Savonius wings, and the novelty of using different angles between the two sets of wings, leads to a third embodiment shown in FIG. 6. Here there are three sets of what will be called for convenience "semi-cylindrical" wings 76A, 76B and 76C. These are fastened to end plates 20 and 19, as are the other sets of wings of FIGS. 4 and 5. The diametral planes 84A, 84C are oriented with respect to each other at 120°.

In the center of the array of semi-cylinders, there is a three-sided prism 88 composed of three S-shaped plates 82A, 82B and 82C. These are much flatter shaped deflecting surfaces than are the corresponding S-shaped wings such as 44 and 46 of FIG. 4. Consider a flow of air according to the dashed arrow 90, which flows into the concave portion of wing 76A, reverses direction 90A, flowing into the concavity of the prism 88 along the surface 82 A and into the concave surface of wing 76B where it forms another reversal 90C. Thus there is direct pressure against the wing 76A and against the surface 82A, and again, against the wing 76B, all in a continuous streamline flow, creating pressure on each of these three surfaces, all directed to provide a torque in the same direction. As shown in FIG. 6, one relationship between the central diverting surfaces 82A, 82B and 82C and the wings 76A, 76B and 76C would be a 30° relationship, where, for example, the diametral plane 84B of wing 76B is parallel to the line 86B, which is in the plane of one apex of the prism 88, and so on.

One obvious advantage of the embodiment of FIG. 6 is that with three axes of symmetry at 120° there is a more continuous torque with angular rotation, for a unidirectional wind, than for the case of FIGS. 4 or 5 for example where there are only two axes of similarity. Furthermore, in FIG. 6, there can be a longer flow pass involving three curved surfaces for the flow of wind, the passage of the wind over the three surfaces providing torque in the same direction. Although shown as simple bent plates the wings 76A and 76B etc. can be thin plates, or have substantial thickness like an aerodynamic wing. Furthermore, they can be in simple semi-cylindrical form, or eliptical form, or in any aerodynamic form desired.

While the invention has been described with a certain degree of particularly it is manifest that many changes may be made in the details of construction and the arrangement of components. It is understood that the invention is not to be limited to the specific embodiments set forth herein by way of exemplifying the invention, but the invention is to be limited only by the scope of the attached claim or claims, including the full range of equivalency to which each element or step thereof is entitled.

What is claimed:

1. A moving-fluid-operated rotor for utilization of a portion of the kinetic energy of a moving fluid, comprising;
    a. four rectangular structures of equal length;
    b. the width of a first and second structure equal to each other, the width of the third and fourth structures equal to each other and wider than the width of the first and second structures;
    c. all four structures curved about an axis parallel to the length of said structures, in the general shape of wings;
    d. the planes of the first and second structures, or wings, as defined by their two edges, being coincident, with one edge of the first wing joined to the opposite edge of the second wing, the first wing being convex while the second wing is concave with respect to their mutual plane;
    e. the third and fourth structures, or wings, positioned substantially coaxial with the first and second wings respectively;
    f. end plates attached to and supporting said wings in their relative positions to form a rigid assembly; and
    g. shaft and bearing means for supporting said assembly for rotation about an axis coincident with the joint between said first and second wings.

2. The rotor as in claim 1 in which all four wings are semi-cylindrical.

3. The rotor as in claim 1 in which all four wings have their edges in the same plane.

4. The rotor as in claim 1 in which said wings are curved aerodynamic sections.

5. The rotor as in claim 1 in which the planes through the edges of said first and second wings are coplanar and the planes through the edges of said third and fourth wings are positioned at a selected angle with respect to the mutual plane of said first and second wings.

6. The rotor as in claim 1 in which the axis of rotation of said rotor is vertical.

* * * * *